(12) United States Patent
Matsumoto

(10) Patent No.: US 8,511,357 B2
(45) Date of Patent: Aug. 20, 2013

(54) PNEUMATIC TIRE WITH TREAD HAVING MAIN GROOVES AND SIPES

(75) Inventor: Hiroyuki Matsumoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 903 days.

(21) Appl. No.: 12/521,008

(22) PCT Filed: Jan. 28, 2008

(86) PCT No.: PCT/JP2008/051158
§ 371 (c)(1),
(2), (4) Date: Jun. 24, 2009

(87) PCT Pub. No.: WO2008/099660
PCT Pub. Date: Aug. 21, 2008

(65) Prior Publication Data
US 2010/0018619 A1 Jan. 28, 2010

(30) Foreign Application Priority Data
Feb. 14, 2007 (JP) .................................. 2007-033937

(51) Int. Cl.
*B60C 11/03* (2006.01)
*B60C 11/12* (2006.01)
*B60C 11/13* (2006.01)

(52) U.S. Cl.
USPC .............. 152/209.8; 152/209.15; 152/209.21; 152/209.24; 152/DIG. 3

(58) Field of Classification Search
USPC ............... 152/209.8, 209.15, 209.21, 209.24, 152/DIG. 3
See application file for complete search history.

(56) References Cited

U.S. PATENT DOCUMENTS

| | | | | |
|---|---|---|---|---|
| 3,384,144 A | * | 5/1968 | Tiborcz | 152/DIG. 3 |
| 3,768,535 A | * | 10/1973 | Holden | 152/209.24 |
| 3,980,118 A | * | 9/1976 | Kinas | 152/209.1 |
| 4,284,115 A | * | 8/1981 | Ohnishi | 152/209.24 |
| 5,830,294 A | * | 11/1998 | Shibata et al. | 152/209.1 |
| 6,250,354 B1 | | 6/2001 | Kawai | |
| 6,341,633 B1 | | 1/2002 | Adlon et al. | |
| 7,028,733 B2 | * | 4/2006 | Ratliff, Jr. | 152/DIG. 3 |

FOREIGN PATENT DOCUMENTS

| | | | |
|---|---|---|---|
| CN | 1243477 | | 2/2000 |
| GB | 460338 A | * | 1/1937 |
| GB | 1549347 A | * | 8/1979 |
| JP | 03-246104 A | * | 11/1991 |
| JP | 03-295706 | | 12/1991 |
| JP | 10-29408 | | 2/1998 |
| JP | 11-208213 A | * | 8/1999 |

(Continued)

OTHER PUBLICATIONS

Machine translation for Japan 2001-294023 (no date).*
Machine translation for Japan 11-342708 (no date).*
Machine translation for Japan 11-208213 (no date).*
Machine translation for Japan 2004-136819 (no date).*
Japanese Examiner Masashi Honda, International Preliminary Report on Patentability for Application No. PCT/JP2008/051158, dated Aug. 19, 2009, 6 pages.
Chinese Office Action for Application No. CN200880001398.3, dated Jan. 29, 2012.
Office Action for Chinese Application No. 200880001398.3 dated Oct. 8, 2012.

*Primary Examiner* — Steven D Maki
(74) *Attorney, Agent, or Firm* — Fish & Richardson P.C.

(57) ABSTRACT

A pneumatic tire has a tread surface is provided with a groove portion, and a land portion sectioned by the groove portion. In wall surfaces facing the groove portion in the land portion, an inside wall surface facing an inner side at a time of being installed to a vehicle is formed by a zigzag surface, and an outside wall surface facing an outer side at a time of being installed to the vehicle is formed by a flat surface.

9 Claims, 2 Drawing Sheets

INNER SIDE OF VEHICLE      OUTER SIDE OF VEHICLE

(56) References Cited

FOREIGN PATENT DOCUMENTS

| | | | |
|---|---|---|---|
| JP | 11-208217 | | 8/1999 |
| JP | 11-245631 | | 9/1999 |
| JP | 11-342708 A | * | 12/1999 |
| JP | 2001-71713 | | 3/2001 |
| JP | 2001-294023 A | * | 10/2001 |
| JP | 2002-219908 | | 8/2002 |
| JP | 2002-321509 | | 11/2002 |
| JP | 2004-136819 A | * | 5/2004 |

* cited by examiner

PNEUMATIC TIRE WITH TREAD HAVING MAIN GROOVES AND SIPES

TECHNICAL FIELD

The present invention relates to a pneumatic tire in which a groove portion and a land portion sectioned by the groove portion are provided in a tread surface, and is particularly useful as a studless tire.

BACKGROUND ART

In general, a groove portion, and a land portion sectioned by the groove portion are provided in a tread surface of a pneumatic tire, and various tread patterns are formed in the tread surface in correspondence to demanded tire performance and used condition. Conventionally, there has been known a pneumatic tire in which a wall surface of a land portion is formed by a zigzag surface, for the purpose of improving a handling performance (a snow handling performance) on an iced road surface, and the like. For example, in the following Patent Document 1, there is disclosed a tire in which a wall surface of a circumferential rib provided in the vicinity of a tire equator is formed by a zigzag surface.

However, in the pneumatic tire mentioned above, a rigidity of the relevant portion is lowered by forming the wall surface of the land portion by the zigzag surface, and there is a problem that a handling performance (a dry handling performance) on a dry road surface is deteriorated. The pneumatic tire described in the following Patent Document 1 is structured such as to improve the snow handling performance, however, does not suggest any means for securing the dry handling performance at all.

Patent Document 1: Japanese Unexamined Patent Publication No. 11-245631

DISCLOSURE OF THE INVENTION

Problems to be Solved by the Invention

The present invention is made by taking the actual condition mentioned above into consideration, and an object of the present invention is to provide a pneumatic tire which achieves both an excellent snow handling performance and an excellent dry handling performance.

Means for Solving the Problems

The present invention provides a pneumatic tire in which a tread surface is provided with a groove portion, and a land portion sectioned by the groove portion, wherein an inside wall surface facing an inner side at a time of being installed to a vehicle is formed by a zigzag surface, and an outside wall surface facing an outer side at a time of being installed to the vehicle is formed by a flat surface, in wall surfaces facing the groove portion in the land portion.

As a result of devoting himself to conduct a study repeatedly for achieving the object mentioned above, the present inventor has derived the present invention as mentioned above by paying attention to the fact that a load change to an outside of a vehicle at a time of turning is great, and a high load tends to be applied to a portion which is in the vicinity of an outer wall surface facing to an outer side at a time of being installed to the vehicle in the land portion, in a road surface having a high friction coefficient such as a dry road surface, however, the load change to the outside of the vehicle at a time of turning is small, and the tendency as mentioned above is small, in a road surface having a low friction efficiency such as an iced road surface.

In other words, in accordance with the pneumatic tire of the present invention, since the inside wall surface facing to the inner side at a time of being installed to the vehicle in the land portion is formed by the zigzag surface, it is possible to improve an edge effect with respect to the iced road surface so as to achieve an excellent snow handling performance. Further, since the outside wall surface facing to the outer side at a time of being installed to the vehicle in the land portion is formed by the flat surface, it is possible to secure a rigidity of a portion to which a high load is applied at a time of turning on the dry road surface, and it is possible to achieve an excellent dry handling performance. As a result, it is possible to well achieve both the snow handling performance and the dry handling performance.

In the above structure, it is preferable that a concave width of the zigzag surface is between 1.0 and 5.0 mm. In accordance with the structure mentioned above, it is possible to properly achieve the operations and effects of the present invention mentioned above while suitably securing the edge effect generated by the zigzag surface, without excessively lowering the dry handling performance.

In the above structure, it is preferable that an angle of cross section of the outside wall surface is made larger than an angle of cross-section of the inside wall surface. Accordingly, since it is possible to effectively secure the rigidity of the portion to which the high load is applied at a time of turning on the dry road surface, it is possible to achieve a more excellent dry handling performance in cooperation with the operations and effects mentioned above obtained by forming the outside wall surface by the flat surface. In this case, the angle of cross section of the wall surface means an angle of a wall surface with respect to a normal line of the tread surface in a cross section in a groove width direction.

In the above structure, it is preferable that an edge portion of the outside wall surface is formed by a taper surface or a circular arc surface. Accordingly, since it is possible to effectively secure the rigidity of the portion to which the high load is applied at a time of turning on the dry road surface, it is possible to achieve a more excellent dry handling performance in cooperation with the operations and effects mentioned above obtained by forming the outside wall surface by the flat surface.

DESCRIPTION OF REFERENCE NUMERALS

| | |
|---|---|
| 1 | Circumferential rib |
| 1a | Inside wall surface of circumferential rib 1 |
| 1b | Outside wall surface of circumferential rib 1 |
| 2 | Block |

-continued

| 2a | Inside wall surface of block 2 |
| 2b | Outside wall surface of block 2 |
| 3 | Block |
| 3a | Inside wall surface of block 3 |
| 3b | Outside wall surface of block 3 |
| 4-7 | Main groove |
| W | Concave width |
| θa | Angle of cross section of inside wall surface |
| θb | Angle of cross section of outside wall surface |

BEST MODE FOR CARRYING OUT THE INVENTION

Figure 1:
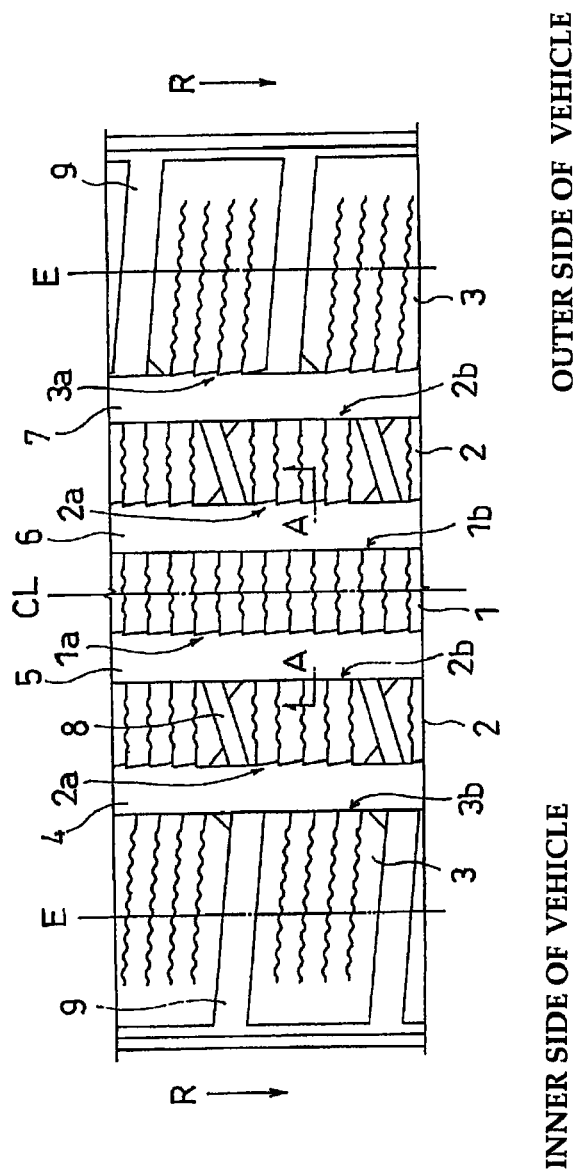
FIG. 1 is a developed view showing an example of a tread surface of a pneumatic tire in accordance with the present invention.
Figure 2:
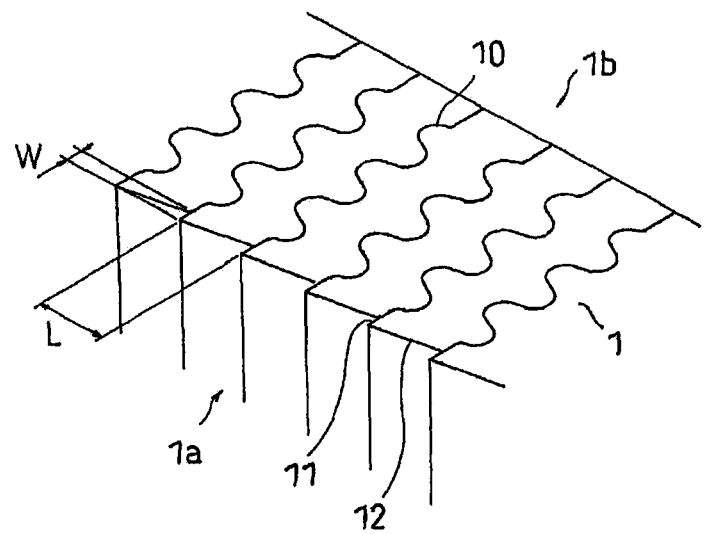
FIG. 2 is a perspective view of a circumferential rib provided in the tread surface.

An embodiment of the present invention will be explained with reference to the drawings. FIG. 1 is a developed view showing an example of a tread surface of a pneumatic tire in accordance with the present invention. FIG. 2 is a perspective view of a circumferential rib provided in the tread surface.

The pneumatic tire is designated an installing direction to a vehicle, a left side in FIG. 1 comes to an inner side at a time of being installed to the vehicle (a vehicle inner side), and a right side in FIG. 1 comes to an outer side at a time of being installed to the vehicle (a vehicle outer side). Reference symbol CL denotes a tire equator, reference symbol E denotes a grounding end, and an arrow R denotes a tire rotating direction. The tread surface is provided with main grooves 4 to 7 linearly extending continuously in a tire circumferential direction, and inclined grooves 8 and 9 extending so as to cut across them, as a groove portion. Further, as a land portion sectioned by the groove portion, there are provided a circumferential rib 1 linearly extending continuously in the tire circumferential direction, and blocks 2 and 3 arranged in both sides in a tire width direction.

In the present embodiment, among wall surfaces facing the main grooves 4 to 7 in the circumferential rib 1 and the blocks 2 and 3, inside wall surfaces 1a to 3a opposing to an inner side at a time of being installed to the vehicle are formed by a zigzag surface, and outside wall surfaces 1b to 3b opposing to an outer side at a time of being installed to the vehicle are formed by a flat surface. In other words, among the wall surfaces extending in the tire circumferential direction as shown in FIG. 1, the wall surfaces 1a to 3a facing the main grooves 4 to 7 from a right side in FIG. 1 are formed by the zigzag surface, and the wall surfaces 1b to 3b facing from a left side in FIG. 1 are formed by the flat surface.

Accordingly, it is possible to achieve an edge effect generated by the zigzag surface of the inside wall surfaces 1a to 3a on the iced road surface, thereby achieving an excellent snow handling performance. Further, since the outside wall surfaces 1b to 3b are formed by the flat surface, it is possible to secure a rigidity of a portion to which a high load is applied at a time of turning on the dry road surface, and it is also possible to achieve an excellent dry handling performance. In the light of a good achievement of the operation and effect mentioned above, in the present invention, it is preferable that an allocation of the zigzag surface and the flat surface is applied to all the wall surfaces facing the main groove extending in the tire circumferential direction.

The inside wall surface 1a formed by the zigzag surface extends while going in and out in the tire width direction so as to alternately repeat peaks and troughs as shown in FIG. 2. In the present embodiment, since a sipe 10 in which an end portion is opened is formed in a root portion of the zigzag surface, the land portion tends to incline at a time of accelerating and braking, and the edge effect generated by the zigzag surface is well achieved in conjunction with the edge effect generated by the sipe 10. It is preferable that a cycle L of the zigzag is between 3 and 8 mm in the light of a suitable achievement of the edge effect generated by the zigzag surface and the land portion rigidity, and the cycle L is more preferably between 4 and 5 mm.

A concave width W of the zigzag surface is preferably between 1.0 and 5.0 mm, and more preferably between 1.0 and 2.0 mm. If the concave width W is less than 1.0, there is a tendency that the edge effect generated by the zigzag surface becomes small. If the concave width W is more than 5.0 mm, the land portion rigidity becomes lowered, and there is a tendency that the handling performance is lowered. In this case, the concave width W is defined as a distance in a groove width direction between a crest portion (a most protruding portion) of the zigzag surface and a root portion (a most recessing portion) thereof.

In the present embodiment, since the zigzag shape of the inside wall surface 1a extends to the portion which is in the vicinity of the groove bottom from the tread surface, it is possible to maintain the edge effect generated by the zigzag surface from a medium term of a wear to an end stage in addition to an initial stage of the wear. In the view of the above, in the present invention, it is preferable that the zigzag surface extends to a position having a depth which is equal to or more than 50% the main groove depth from the tread surface, and it is more preferable that it extends to a position having a depth which is equal to or more than 70%.

The shape of the zigzag surface in the present invention is not particularly limited as far as the edge effect with respect to the iced road surface can be achieved, however, in the present embodiment, the zigzag surface is constructed by alternately repeating a first portion 11 in which an angle with respect to the tire circumferential direction is about 90 degree and a second portion 12 which is inclined with respect to the tire circumferential direction. The edge effect generated by the zigzag surface is mainly achieved by the first portion 11, and can well improve a snow handling performance. The second portion 12 is inclined to the main groove 5 side toward an opposite direction to a tire rotating direction R, and is provided in such a manner as not to prevent a water stream within the main groove 5 at a time of traveling on a wet road surface.

The zigzag surface is set so as to form a concave shape in place of a convex shape with respect to a normal wall surface having no zigzag shape. Accordingly, it is possible to prevent an actual see through void on the tread surface from reducing, to increase a drainage performance in cooperation with the shape of the zigzag surface as mentioned above, and to secure a hydroplaning resistance, by forming the wall surface of the land portion by the zigzag surface.

Figure 3:
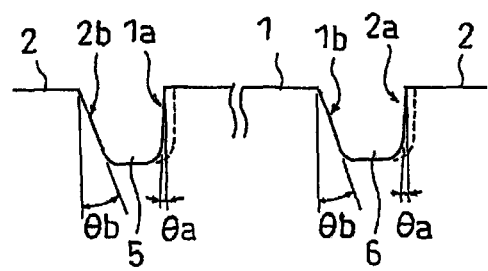
FIG. 3 is a cross sectional view taken along line A-A in FIG. 1.

FIG. 3 is a cross sectional view as seen from an arrow A-A in FIG. 1, and shows a cross section in the groove width direction of the main grooves 5 and 6. As mentioned above, in the present embodiment, an angle θb of cross section of the outer wall surfaces 1b and 2b is made larger than an angle θa of cross section of the inner wall surfaces 1a and 2a. Accordingly, since it is possible to effectively secure the rigidity of the portion to which the high load is applied at a time of turning on the dry road surface, it is possible to achieve a more excellent dry handling performance in cooperation with the operations and effects obtained by forming the outside wall surface 1b and 2b by the flat surface. Taking into consideration a groove volume or the like in addition to the operation and effect mentioned above, it is preferable that the angle θa of cross section is between 0 and 5 degree, and the angle θb of cross section is between 10 and 20 degree.

In the present invention, it is preferable that an edge portion of the outside wall surface 1b is formed by a taper surface 13 or a circular arc surface 14 as shown in FIGS. 4(a) and (b). Accordingly, since it is possible to effectively secure the rigidity of the portion to which the high load is applied at a time of turning on the dry road surface, it is possible to achieve a more excellent dry handling performance in cooperation with the operations and effect obtained by forming the outside wall surface 1b by the flat surface.

In the present invention, as mentioned above, it is preferable that the allocation of the zigzag surface and the flat surface is applied to all the wall surfaces facing the main groove extending in the tire circumferential direction, however, it is further preferable that a size relation of the angle of cross section mentioned above is satisfied with respect to all the wall surfaces, and it is preferable that the edge portions of all the outer wall surfaces are formed by a taper surface or a circular arc surface.

Figure 4:
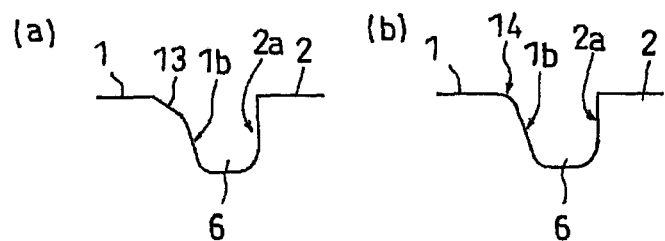
FIG. 4 is a view showing a modified example of a cross section in a groove width direction of a main groove.

The description is given above by exemplifying the wall surfaces 1a and 1b of the circumferential rib 1 with reference to FIGS. 2 to 4, however, the same structure can be applied to the wall surfaces 2a and 2b of the block 2 and the wall surfaces 3a and 3b of the block 3, and the cycle, the concave width, the depth, the shape and the like of the zigzag surface can be structured in the same manner as mentioned above. In the present invention, the concave width, the shape and the like of the inside wall surfaces 1a to 3a formed by the zigzag surface may be identical with each other or different from each other.

The present invention is useful as a studless tire (a winter tire). The winter tire employs a comparatively soft tread rubber in which a rubber hardness measured in accordance with a durometer hardness test (type A) of JIS K6253 is about 45 to 65 degree, particularly about 45 to 55 degree domestically, and the dry handling performance tends to be lowered. However, in accordance with the present invention, it is possible to achieve both the excellent snow handling performance and the excellent dry handling performance as mentioned above.

The pneumatic tire in accordance with the present invention is the same as the normal pneumatic tire except the structure as mentioned above of the tread surface, and the present invention can employ any of the conventionally known material, shape, structure, manufacturing method and the like.

Other Embodiment

The tread pattern of the pneumatic tire in accordance with the present invention is not limited to that shown by the embodiment mentioned above, but may be structured such that the main groove extends like a bent line or a V-shaped groove is provided. Further, in the case of attaching importance to the performance as the winter tire, all the land portions may be constructed by the blocks. The tread pattern may be symmetrical or asymmetrical in the tire width direction, except the difference between the zigzag surface and the flat surface in the wall surface.

In the embodiment mentioned above, there is shown the example in which the wall surface facing the groove extending linearly in the tire circumferential direction is formed by the zigzag surface, however, in the present invention, the wall surface facing the groove which is inclined with respect to the tire circumferential direction or the groove which extends as a curve may be formed by the zigzag surface as long as it is the wall surface opposing to the inner side at a time of being installed to the vehicle. In the case of forming the wall surface facing the curved groove by the zigzag surface, the concave width and the angle of cross section can be specified by setting a direction of normal line of a center line of the groove to the groove width direction.

EXAMPLE

An example tire which concretely shows the structure and effect of the present invention will be explained. An evaluation of each of performances is executed as follows.

(1) Snow Handling Performance

A tire was installed to an actual car (FR sedan of domestically built 3000 cc class), was traveled on the iced road surface at a vehicular designated pneumatic pressure, performed a straight running, a turn running, a braking and the like, and was evaluated by a subjective evaluation of a driver. In this case, an evaluation is carried out on a scale of one to ten, and shows that the greater the numerical value is, the more excellent the snow handling performance is.

(2) Dry Handling Performance

A tire was installed to an actual car (FR sedan of domestically built 3000 cc class), was traveled on the dry road surface at a vehicular designated pneumatic pressure, performed a straight running, a turn running, a braking and the like, and was evaluated by a subjective evaluation of a driver. In this case, an evaluation is carried out on a scale of one to ten, and shows that the greater the numerical value is, the more excellent the dry handling performance is.

(3) Hydroplaning Resistance

A tire was installed to an actual car (FR sedan of domestically built 3000 cc class), and was traveled on a straight course having a wet road surface of 8 mm water depth at a vehicular designated pneumatic pressure, and a speed at the time when the hydroplaning phenomenon was generated was measured. An evaluation is shown by an index number in the case of setting a comparative example 1 to 100, and shows that the greater the numerical value is, the more excellent the hydroplaning resistance is.

Comparative Examples 1 and 2

In the tread surface shown in FIG. 1, a comparative example 1 was set to a pneumatic tire in which all the wall surfaces facing the main groove of the land portion were formed by the flat surface, and a comparative example 2 was set to a pneumatic tire in which all the wall surfaces facing the main groove of the land portion were formed by the zigzag surface. Further, angles of cross section of the wall surfaces were uniformly set to 10 degree, and the cycle of the zigzag surface in the comparative example 2 was set to 5 mm, and the concave width was set to 2 mm. In this case, tire sizes were all set to 205/55R16.

Examples 1 and 2

In the tread surface shown in FIG. 1, examples 1 and 2 were set to pneumatic tires in which the inside wall surface was formed by the zigzag surface, and the outside wall surface was formed by the flat surface, in the wall surfaces facing the main groove of the land portion. Further, the angle of cross section of the wall surface was set to $\theta a=\theta b=10$ degree in the example 1, and $\theta a=0$ degree, and $\theta b=20$ degree in the example 2, and the cycle and the concave width of the zigzag surface were set to be identical to that of the comparative example 2. In this case, tire sizes were all set to 205/55R16. Results of the evaluation are shown in Table 1.

TABLE 1

|  | Comparative example 1 | Comparative example 2 | Example 1 | Example 2 |
|---|---|---|---|---|
| Snow handling performance | 5 | 6 | 6 | 6 |
| Dry handling performance | 6 | 5 | 6 | 7 |
| Hydroplaning resistance | 100 | 100 | 100 | 100 |

As can be seen from Table 1, since the edge effect generated by the zigzag surface is not achieved in the comparative example 1, the snow handling performance is low, and since a rigidity of a portion to which a high load is applied at a time of turning on the dry road surface is not secured in the comparative example 2, the dry handling performance is low. On the contrary, it is known that the excellent snow handling performance and the dry handling performance are achieved in a state of securing the hydroplaning resistance, in the examples 1 and 2. Particularly, in the example 2, since the angle of cross section of the outside wall surface is made comparatively large, the rigidity of the portion to which the high load is applied at a time of turning on the dry road surface is secured, and the more excellent dry handling performance than the example 1 can be achieved.

What is claimed is:

1. A pneumatic tire in which a tread surface is provided with a plurality of main grooves, and land portions defined by the main grooves, wherein all inside wall surfaces of the main grooves face an inner side at a time of being installed to a vehicle and are formed by a zigzag surface, the zigzag surface being constructed by alternately repeating a first portion in which an angle with respect to a tire circumferential direction is about 90 degrees and a second portion which is inclined with respect to the tire circumferential direction and all outside wall surfaces of the main grooves face an outer side at a time of being installed to the vehicle and are formed by a flat surface, in wall surfaces facing the main grooves in the land portions, and the land portions have sipes, all of which extend in a tire width direction and are open at each end, one end of each sipe being open in a root portion of the zigzag surface of one of the inside wall surfaces and the other end of each sipe being open to one of the outside wall surfaces formed by the flat surface.

2. The pneumatic tire according to claim 1, wherein a concave width of the zigzag surface is between 1.0 and 5.0 mm.

3. The pneumatic tire according to claim 2, wherein an edge portion of the outside wall surfaces is formed by a taper surface or a circular arc surface.

4. The pneumatic tire according to claim 2, wherein an angle of cross section of the outside wall surfaces is made larger than an angle of cross section of the inside wall surfaces.

5. The pneumatic tire according to claim 1, wherein an angle of cross section of the outside wall surfaces is made larger than an angle of cross section of the inside wall surfaces.

6. The pneumatic tire according to claim 3, wherein an edge portion of the outside wall surfaces is formed by a taper surface or a circular arc surface.

7. The pneumatic tire according to claim 1, wherein an edge portion of the outside wall surfaces is formed by a taper surface or a circular arc surface.

8. The pneumatic tire according to claim 1, wherein the second portion is inclined toward a main groove side when viewed in a direction opposite to a tire rotation direction.

9. The pneumatic tire according to claim 1, wherein the sipe is wave-shaped along the tire width direction.

* * * * *

UNITED STATES PATENT AND TRADEMARK OFFICE
CERTIFICATE OF CORRECTION

PATENT NO.       : 8,511,357 B2
APPLICATION NO.  : 12/521008
DATED            : August 20, 2013
INVENTOR(S)      : Hiroyuki Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Fifteenth Day of September, 2015

Michelle K. Lee
*Director of the United States Patent and Trademark Office*